(12) United States Patent
Jacobs et al.

(10) Patent No.: US 8,098,402 B2
(45) Date of Patent: Jan. 17, 2012

(54) DOCUMENT TARGETING SYSTEMS AND METHODS

(75) Inventors: William S. Jacobs, Los Angeles, CA (US); Michael E. Farrell, Williamson, NY (US); David E. Rumph, Pasadena, CA (US); Stephen M. Strasen, San Pedro, CA (US)

(73) Assignee: Xerox Corporation, Norwalk, CT (US)

( * ) Notice: Subject to any disclaimer, the term of this patent is extended or adjusted under 35 U.S.C. 154(b) by 1343 days.

(21) Appl. No.: 11/094,440

(22) Filed: Mar. 31, 2005

(65) Prior Publication Data

US 2006/0262339 A1 Nov. 23, 2006

(51) Int. Cl.
*H04N 1/40* (2006.01)

(52) U.S. Cl. .................................. 358/2.1; 358/1.16
(58) Field of Classification Search ............ 358/1.1–1.9, 358/1.13, 1.15, 448, 2.1, 296; 101/484
See application file for complete search history.

(56) References Cited

U.S. PATENT DOCUMENTS

| | | | | |
|---|---|---|---|---|
| 5,287,194 A | * | 2/1994 | Lobiondo | 358/296 |
| 5,465,165 A | * | 11/1995 | Tanio et al. | 358/448 |
| 5,509,108 A | * | 4/1996 | Yeh | 358/1.15 |
| 6,067,406 A | * | 5/2000 | Van Hoof et al. | 358/1.9 |
| 6,584,903 B2 | * | 7/2003 | Jacobs | 101/484 |
| 7,130,864 B2 | * | 10/2006 | Lin et al. | 1/1 |
| 2003/0160985 A1 | * | 8/2003 | Bailey | 358/1.9 |
| 2004/0080789 A1 | * | 4/2004 | Anderson | 358/2.1 |
| 2004/0190042 A1 | * | 9/2004 | Ferlitsch et al. | 358/1.15 |
| 2005/0262437 A1 | * | 11/2005 | Patterson et al. | 715/517 |

* cited by examiner

*Primary Examiner* — Twyler Haskins
*Assistant Examiner* — Lennin Rodriguez
(74) *Attorney, Agent, or Firm* — Oliff & Berridge, PLC

(57) ABSTRACT

A raster image target tracking method, the raster image being a binary raster image or a targeted contone raster image, may include determining target information that corresponds to a target device for the raster image, saving the target information in a memory, comprising the raster image target device to a processing device by which the document is to be processed, and providing a warning message when the document target device does not correspond to the processing device. Also, a compound document analysis and target tracking method may include providing a compound document, analyzing each object of the compound document to determine target information, saving the target information in a memory, comparing the target devices of the respective objects to each other, and providing a warning message to a user when the target devices of the respective objects do not correspond to each other.

20 Claims, 6 Drawing Sheets

TARGETED

MISTARGETED

DOCUMENT TARGETING SYSTEMS AND METHODS

BACKGROUND

Binary raster images represent image data as a sequence of pixels using a single bit per pixel. Binary raster image files may be contained in, for example, TIFF files or in PDL files such as, for example, PDF files. Using various lossless compression algorithms, binary image files may be relatively small, but are able to support high image quality. Print controllers may process such binary raster images at rates of hundreds of pages per minute. For these reasons, binary raster images are widely used throughout the printing industry. Currently, document creation and assembly systems obtain binary raster images in a variety of ways: i) capture by a scanning device; ii) output from a print controller decomposition service; and iii) import.

Regardless of their origin, all binary raster images are device-dependent. In other words, each binary raster image represents information in a way appropriate to a particular type of output device such as, for example, a printer to which the binary raster image is best used. The specific output device is identified as the target for the binary raster image, and the identity of the specific output device is part of the targeting of the binary raster image. When incorporated into documents such as Microsoft® Word, Microsoft® PowerPoint®, Adobe® PDFs or Xerox's® DigiPath Raster Document Objects™, the original targeting of the images remains.

Makeready/prepress applications running on client workstations may obtain device-dependent targeted raster images from different sources, e.g., by scanning physical pages into electronic files or by rasterizing pages represented in page description languages. Once on the client workstation, the targeted raster images may be submitted to a printer for printing.

There are two main types of device-dependent targeted raster images: binary raster images and device-dependent contone raster images.

Device-dependent binary rasters are printer specific. Binary raster images are primarily intended for use on traditional one-toner printers. Examples of binary raster image files include TIFF 6.0 CCITT Group 4 files and images stored in PDF files by various binary compression algorithms. As the characteristics of different print engines vary, so too do the device-dependent binary raster images that are targeted. Factors such as whether the engine writes white or black, the minimal reproducible line width, different tone reproduction curves, availability of particular halftone screens, and the use of error diffusion to minimize moiré effect all affect how best to render the raster data for a particular image.

Contone raster images in, for example, a CMYK print engine's color space, use multiple bits per pixel to represent their output. Formats may vary, but very commonly eight bits are used to represent each colorant. Hence, for a CMYK raster image consisting of four colorants (cyan, magenta, yellow and black), 32 bits are used to represent each pixel. However, while these CMYK raster images are well suited for a specific printer, if they are submitted to a different CMYK printer, image quality may be negatively impacted. In general, a contone raster image can become device-dependent when a color decomposer converts an output that is targeted for a CMYK printer to the CMYK color space, during which process any current rendering information is applied. The resulting decomposer output files then contain the CMYK data needed to target a specific output device. Examples of contone raster image files include TIFF 6.0 Technical Note #2 files, and contone raster images stored in Portable Document Format (PDF) files by a JPEG compression algorithms.

The above-described examples of raster image files may also be contained in Page Description Language (PDL) files. Examples of PDLs include Adobe Postscript, Adobe Portable Document Format (PDF) and Hewlett Packard's Page Composition Language (PCL). Moreover, when a PDL file contains a raster image that is targeted to a specific type of device, then the PDL file that contains the raster image also becomes targeted to the same type of device. However, there are many other ways in which PDL files may be made device-dependent, optimally targeted to particular output devices: i) varying rasterization parameters: printers have different resolution; ii) varying color spaces: color is a major source of PDL variations as producers generate files optimized for specific output devices; iii) varying halftone screening parameters: certain PDL files may contain screening instructions (such as the number of lines per inch and dot patterns) controlling the way in which the file is to be processed prior to printing; iv) trapping: to compensate for paper misregistration when processing PDLs for certain printers, abutting color areas are slightly spread or choked to avoid generating unwanted artifacts; v) varying Open Prepress Interface parameters: certain systems support replacing low resolution for position-only images with high resolution press images; vi) varying fonts: knowing font availability for different output devices determines where the PDL may be properly processed; vii) altering device specific PDL instructions: some PDLs may contain specific device control instructions associated with such document output functions as simplex versus duplex printing, document finishing, paper stock selection and covers; or viii) altering color separated files: during generation of color separated files, two processing techniques, undercolor removal (UCR) and gray component replacement (GCR), may be applied, and the resulting color separated files are generally targeted to specific printers.

For example, a specific PDL file format, PostScript, may be targeted to specific output devices via the following user controlled selections: i) effective raster image resolution; ii) color conversion strategy; iii) compression type and parameters; iv) anti-aliasing, which increases the number of bits per sample; v) font embedding; vi) black overprint; vii) Open Prepress Interface; viii) parse Document Structuring Convention (DSC) comments; and ix) autorotate pages.

In recent years, so-called preflight software tools or applications have been developed. Such applications evaluate files for print features that may cause possible defects (e.g., missing fonts, inappropriate raster image resolution, use of spot colors on a process color device, color spaces, and the like). Often users may select from among hundreds of possible criteria. Preflight software packages now form an established part of the printing industry and include offerings from a range of vendors.

Also, numerous current software applications (for example, Microsoft® Word®, Microsoft® PowerPoint® and Adobe® Acrobat®) allow users to create compound documents incorporating such raster images, where the term "compound document" simply is taken to refer to a document that contains one or more objects. The objects contained may include both include raster images and PDLs. The objects may generally be created separately from one another prior to their incorporation into the container compound document, thereby allowing the possibility that, even if the objects are of the same type, the objects may differ in certain crucial respects such as, for example, the intended target output device.

SUMMARY

However, none of the above-described systems currently consider the issue of binary raster image targeting, nor do they perform any image analysis on binary images to determine appropriate targeting. Rather, such systems treat all binary raster images as equivalent, and do not consider possible difficulties resulting from binary raster image submission to an inappropriate device. As a result, mistargeting may readily occur, and a first user indication of mistargeting problems may be, for example, deficient output pages.

Figure 1:
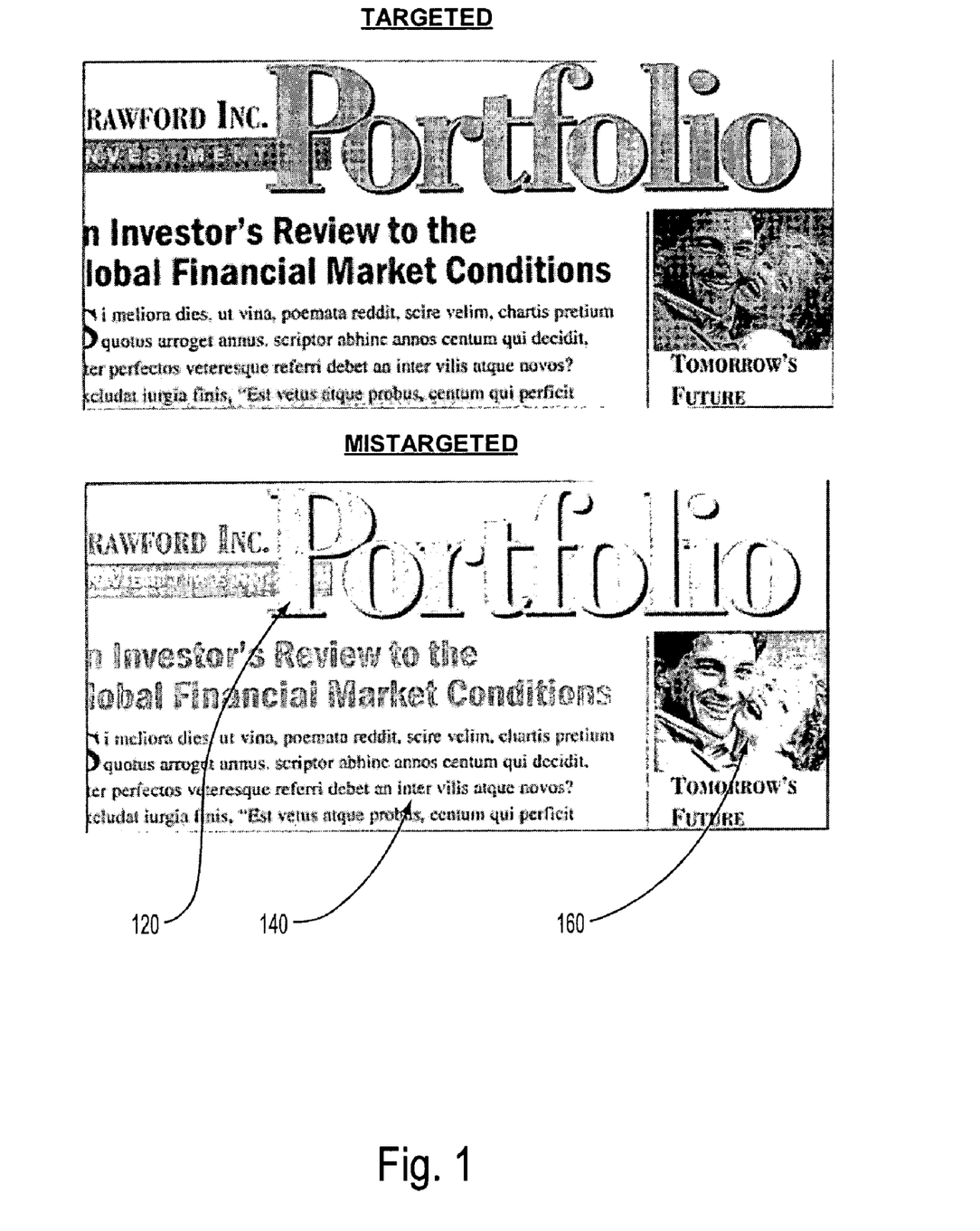
FIG. 1 is an illustration of an example of mistargeting for binary raster images.
Figure 2:
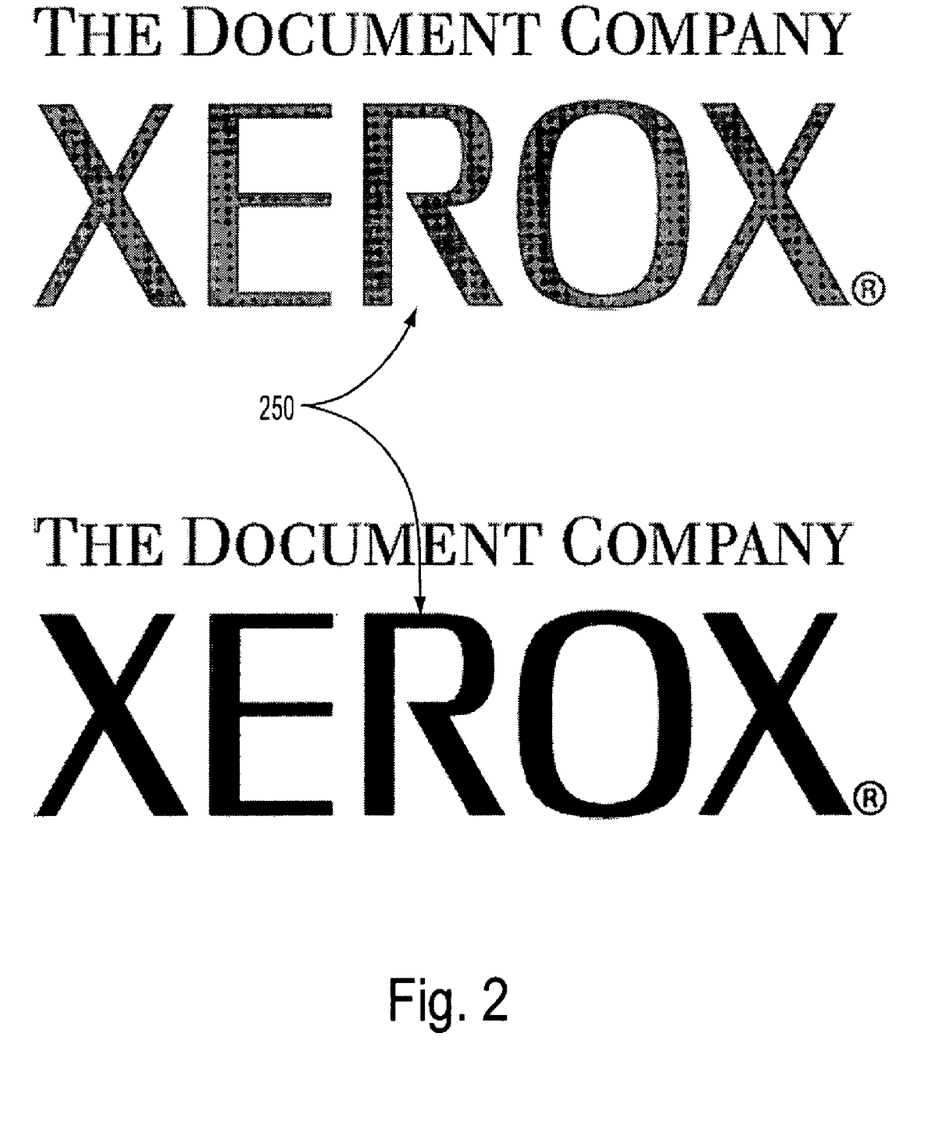
FIG. 2 is another illustration of an example of mistargeting for contone raster images.

Sub-optimal image quality may result from submitting a raster image to an output device that is not the intended target of the raster image. Most current commercial software packages treat all binary raster images as equivalent to one another and make no effort to preserve targeting information. FIGS. 1 and 2 illustrate examples of raster image mistargeting. In FIG. 1, which shows mistargeting of a binary raster image, element 120 indicates a spot on the image where the appearance of the text is washed out; element 140 indicates the sub-optimal effect of mistargeting on the shaded background; and element 160 indicates the poor contrast of the picture because of mistargeting. In FIG. 2, which shows mistargeting of a contone raster image, element 250 indicates the difference in rendering on printers with different targeting.

Device-dependent binary raster images are generally targeted for optimal output only on a specific print engine. As the marking characteristics of different monochrome printers vary, so too will the device-dependent binary raster images targeted for the printers. Factors such as whether the engine writes white or black, the minimal reproducible line width, line growth, different tone reproduction curves, availability of particular halftone screens and the use of error diffusion to minimize moiré effect, all affect how best to render a raster image for a particular engine. Hence, if these device-dependent binary raster images are sent to a print engine other than their intended target, significant image quality degradation may result.

Furthermore, in order to drive a CMYK print engine, print jobs must first be converted to raster images in the print engine's color space, which then are used to drive the engine's marking facility. While these CMYK raster images are well suited for a specific printer, should such images be submitted to a different CMYK device, image quality may be negatively impacted. Because of color profile differences, certain colors printable on one device may be unavailable on the other device. At the very least, adjustments may be required, which also may cause degradation in image quality.

While Page Description Languages (PDLs) such as Adobe PostScript, Adobe Portable Document Format (PDF), or Hewlett Packsard's Page Composition Language (PCL) are often device independent, PDLs can be targeted to specific devices when they contain images that are themselves targeted to specific devices. As discussed above, a PDL may be targeted to specific output devices via raster image resolution, color conversion strategy, compression type and parameters, anti-aliasing, font embedding, black overprint, Open Prepress Interface, Document Structuring Convention (DSC) comments, or autorotate pages. When a PDL contains an image that is targeted to a specific device, then the target of the image contained in the PDL becomes the target of the PDL.

Figure 3:
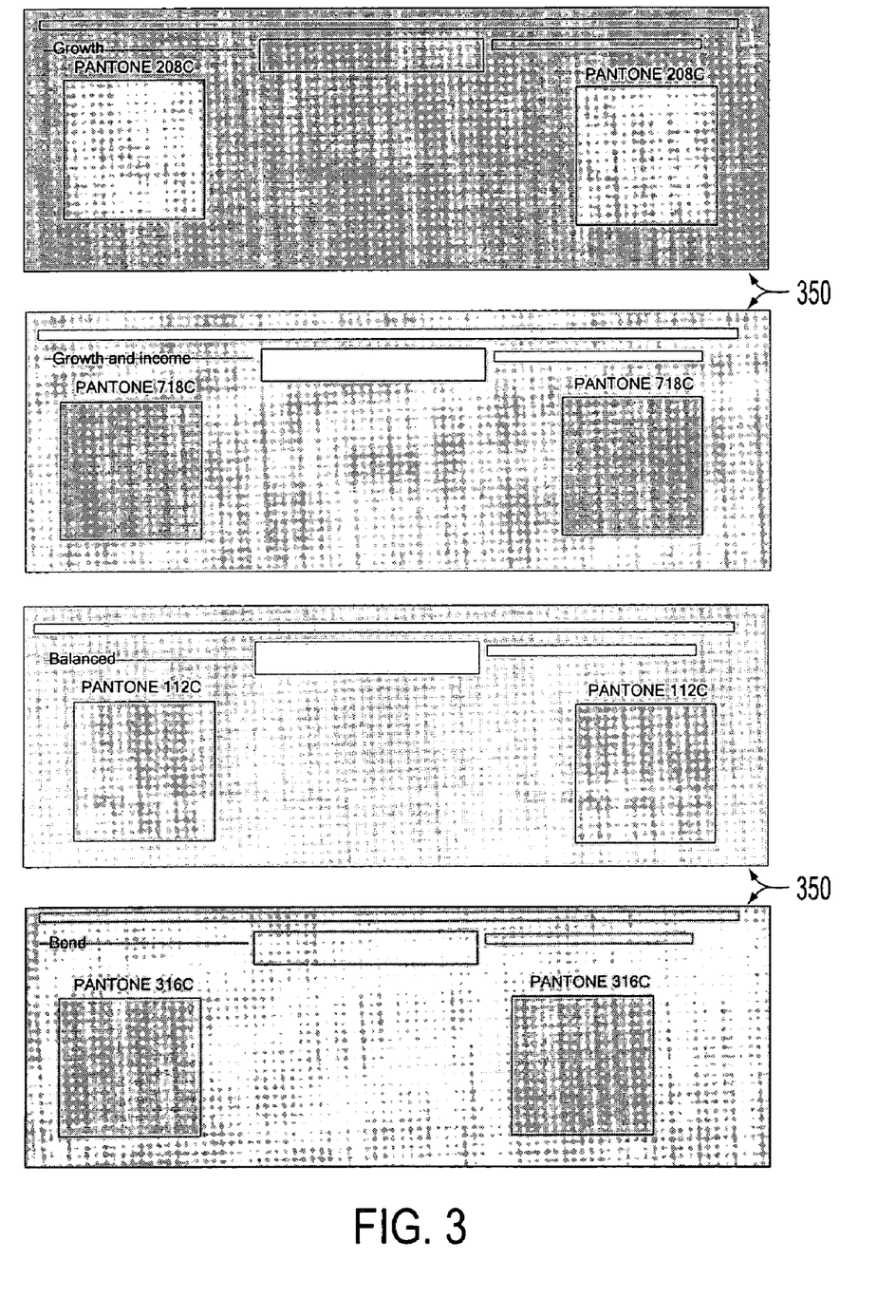
FIG. 3 is another illustration of an example of mistargeting for a targeted PDL file.

In FIG. 3, which shows mistargeting of a targeted PDL file, element 350 indicates the effect of different color spaces on the rendering of the image. The problem of mistargeting is particularly damaging because users are not alerted to the fact that their actions are problematic. From the user's viewpoint, different PDL files of the same type such as, for example, PostScript™ or PDF, appear to be the same. There is no indication that one group of files should only be printed on certain printers while an apparently similar group of files should only be printed on a different printer. Generally users first learn of the problem when they discover that their printed pages have sub-optimal image quality, resulting in aggrieved users, wasted effort and the need to rerun jobs.

Furthermore, as a compound document is created, different component objects may be incorporated therein. If one of these components is a device-dependent raster image or a device-dependent PDL file targeted for optimal output on a specific device, then the device dependency of the raster image or of the PDF file transfers to the entire compound document. The component device dependencies transfer from the components to the entire compound document, whether the compound document contains raster images or PDL files.

In light of the above described problems and shortcomings, various exemplary methods provide a raster image target tracking method that includes determining a target information that corresponds to a target device for a raster image, saving the target information in a memory, comparing the raster image target device to a processing device by which the raster image is to be processed, and providing a warning message to a user when the raster image target device does not correspond to the processing device. Also, various exemplary methods provide a compound document analysis and target tracking method that includes providing a compound document that comprises two or more objects, analyzing each object to determine a target information that corresponds to a target device of the object, saving the target information in a memory that is a part of the format of the compound document, comparing the target devices for each object to each other, and providing a warning message to a user when the target devices of the two or more objects do not correspond to each other.

Various exemplary systems provide a document target tracking system that includes a controller, a memory that comprises document target device information that corresponds to a target device, wherein the controller compares the document target device to a processing device by which the document is to be processed, and the controller provides a warning message to a user when the document target device does not correspond to the processing device.

Various exemplary devices provide a marking device that includes an input module that inputs a document, a processing module that comprises a memory, and an output module that outputs the document to a processing device, wherein the memory comprises the document target device information, and a warning message is provided to a user when the document target device does not correspond to the processing device.

These and other features and advantages are described in, or are apparent from, the following detailed description of various exemplary implementations of systems and methods.

BRIEF DESCRIPTION OF THE DRAWINGS

Various exemplary implementations of systems and methods are described in detail, with reference to the following figures, wherein.

DETAILED DESCRIPTION OF EMBODIMENTS

Figure 4:
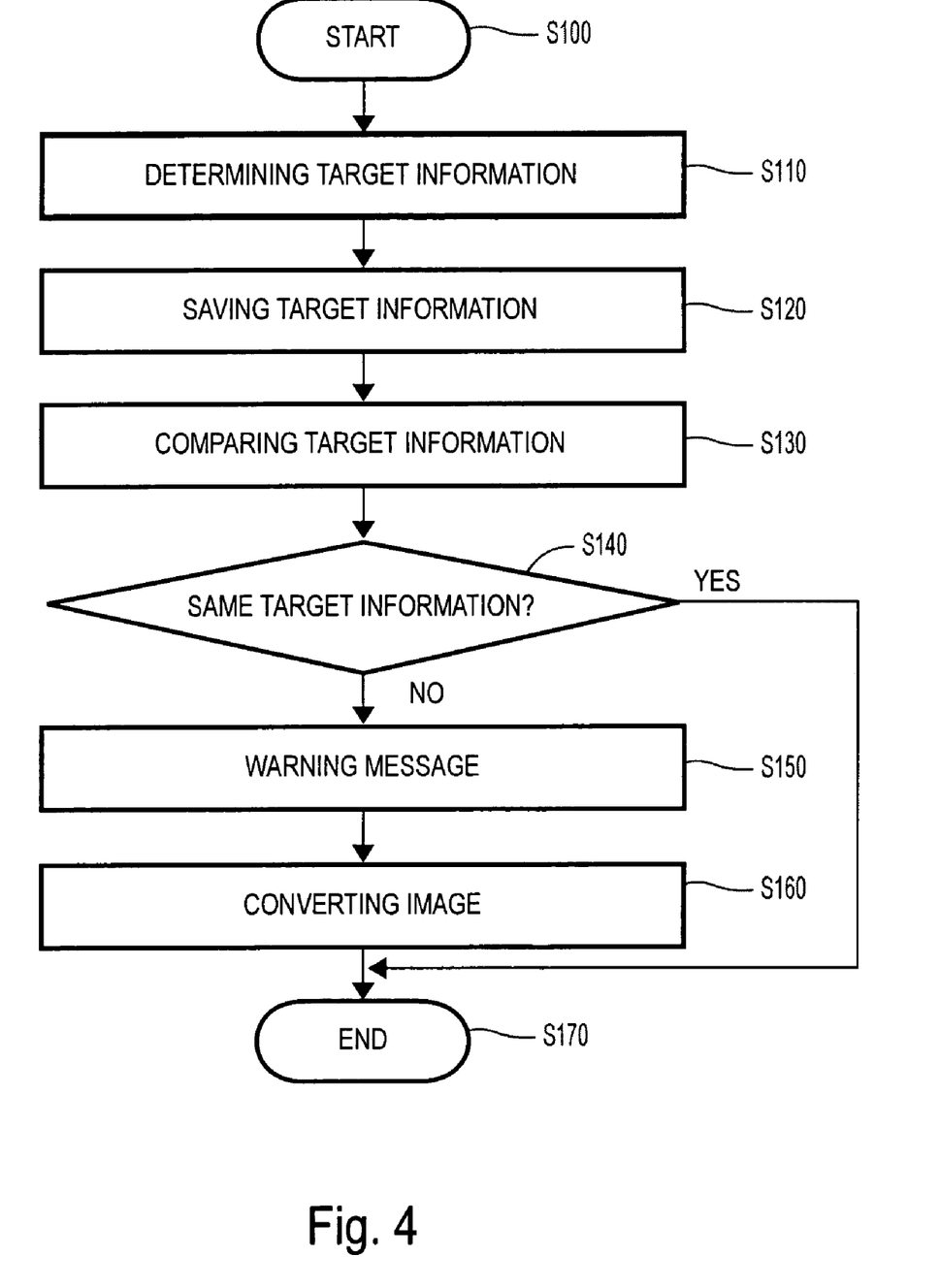
FIG. 4 is a flow chart illustrating a preflight process as applied to a binary raster, according to various exemplary implementations.

FIG. 4 is a flow chart illustrating a preflight process as applied to a binary raster, according to various exemplary implementations. In FIG. 4, the method starts in step S100 and continues to step S110, during which the target information of an image may be determined. During step S110, the target information of an image may be determined when the image is acquired via, for example, a scanner, a print controller decomposition service, or an import from a third party source. Should the image be accompanied by targeting tags that contain targeting information, then such information may be utilized. It should be noted that the image may be a binary raster image, a contone raster image or a PDL file. Should the targeting information tags be absent from the image, then the image data itself may be analyzed. Characteristics such as, for example, the halftone screening, the width of lines, the presence and type of error diffusion, the halftone dot shape, the number and frequency of dot cells, the inherent tone reproduction curves and write white/write black targeting may be part of the analysis of the image and the determination of a target printer for the image.

Next, control continues to step S120, during which the target information may be saved. If the device-dependent image target is known, then the target is saved, but images with unknown targeting or device independent images may be marked, respectively, as "unknown" or "none." During this step, when the image is processed, the targeting information may be saved in a memory. Upon export of the image, for example during printing or electronic export to another system, the targeting information may also be output with the image. When the image is, for example, printed, the targeting information may be incorporated into the print submission.

In the case of raster images, the raster image targeting information may be saved during step S120 in a number of different ways. Examples of how and when the specific place and form in which the information regarding the target device is stored include:

(1) Inside the raster image file itself: targeting information tags may be created at the time a scanner captures a page into a raster image file, at the time a decomposition service itself generates the raster image file, or when a client workstation imports a raster image.

In the case of raster images embedded in PDL files, recent PDL file format extensions to support embedded XML logical markup may be readily adapted to support target tagging. Each device-dependent PDL may be labeled to indicate an intended output device. In the case of raster images embedded in PostScript™ files, there is no current explicit target tagging mechanism, but via Document Storage Convention (DSC), raster image labeling may be readily provided. One advantage of this approach is that, by storing the targeting information within the raster image file itself, there is no danger of the targeting information and the image being separated and the targeting information being lost.

(2) Inside a compound document composed of the image files: When device-dependent raster images are processed by a makeready/prepress application running on a client workstation, the images may be gathered into a compound document. Such documents may contain printer targeting information. One advantage of this approach is that, by storing the targeting information in a document format, the targeting information may be readily accessed at print time. Another advantage is that the compound document may store a processing history of the images such as, for example, original target and/or successive targets, a number of times that an image has been retargeted, and the like.

(3) In metadata: When saved in a document repository, the targeting may be preserved as a part of the information used to describe the image file. One advantage of this approach is that, by storing the targeting information in a document repository or database, the targeting information may be readily accessed at print time. Another advantage is that the database may be used to store the processing history of the image such as, for example, original target and/or successive targets, a number of times that an image has been retargeted, and the like.

Next, control continues to step S130. During step S130, the image targeting information may be compared to the output target or decomposition service by which the image is to be processed. Next, control continues to step S140, during which a decision may be made with respect to compatibility of the targeting information of the image and the output target. If the target information of the image is the same as the output target, then control continues to step S170. If the target information of the image and of the target device are not the same, then control continues to step S150, during which, for example, a warning message may be displayed to the user, for example, to inform the user that the targeting information of the image is different from the output device and/or that a sub-optimal processing performance may result. Next, control continues to step S160.

During step S160, when the targeting information of the image is different that the output target, there is the possibility of converting the image to a different target device. In the case of binary raster images, in order to convert the image to a different target device, the image may be returned from a binary representation to a grayscale representation. Then, the image may be returned into a binary image targeted to the new target device. In the case of contone raster images, in order to convert the image to a different target device, the image may be transformed by a CMYK to CMYK conversion. In the case of targeted PDL files, a conversion of a targeted PDL file to a different target device depends on the nature of the target such as, for example, change of trapping parameters or use of a different available font. For example, this analysis may be made part of already existing preflight software applications. Next, control continues to step S170, where the method ends.

Figure 5:
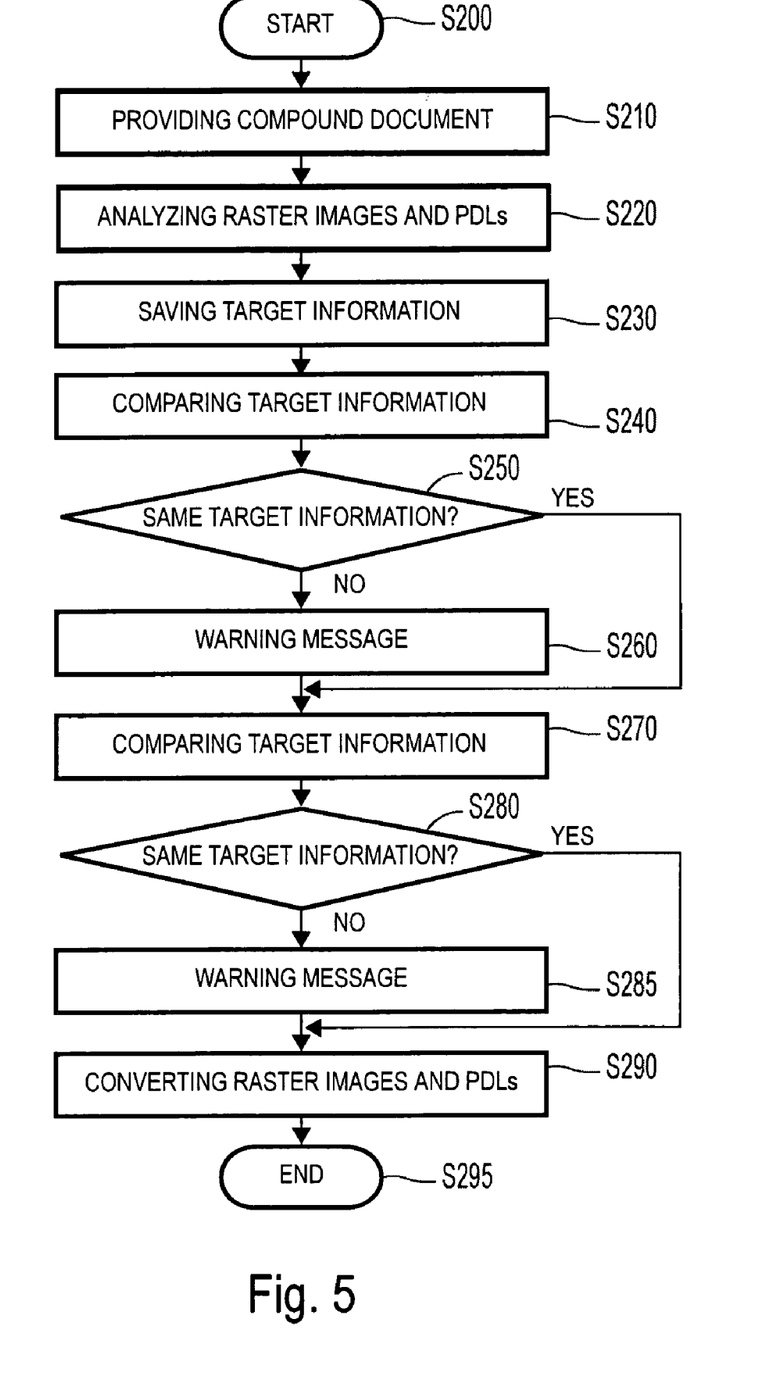
FIG. 5 is a flow chart illustrating a method of tracking a compound document target, according to various exemplary implementations.

FIG. 5 is a flow chart illustrating an exemplary method of tracking a compound document target. The method starts in step S200, then continues to step S210, during which a compound document may be provided. According to various exemplary implementations, a compound document may be a document that may contain one or more objects. The objects may be binary raster images, contone raster images, or PDLs. Next, control continues to step S220, where the objects present in the compound document may be analyzed. The objects may be raster images such as binary raster images or contone images, or targeted PDLs. For example, as device-dependent objects are added to the compound document, information on the intended target of each object of the compound document may be determined. If a device-dependent object is incorporated into the compound document when the compound document does not already contain a device-dependent object, then a warning message indicating that the compound document is becoming targeted may be displayed. Otherwise, the target of the compound document becomes the target of the first device-dependent object that is incorporated into the compound document.

Next, control continues to step S230, during which the targeting information of each object that makes up the compound document may be saved in a memory. The targeting information may be stored, for example, inside the compound document itself as part of its format, or in metadata, in a document repository, where the targeting information may be saved as part of the information used to describe the object file. Next, control continues to step S240, where the target information for all the objects that make up the compound document are compared to each other. For example, when a new device-dependent object is incorporated into a compound document that already contains at least one device-dependent object, then the targeted devices for each device-dependent object may be compared to one another. Next, control continues to step S250.

During step S250, if the target device of a newly incorporated object is the same as the target device of all the objects that are already incorporated into the compound document, then control continues to step S270. However, if the target device of the newly incorporated object is different than the target devices of the objects already incorporated into the compound document, then control continues to step S260, during which a warning message may be issued to a user. The warning message may ask the user to choose whether to abort the addition of the new object, whether to continue the addition of the new object without change, whether to perform possible remedial actions to adjust the object targeting of the compound document, or whether to simply override the warning message and continue with the processing of the compound document regardless. Next, control continues to step S270.

During step S270, the compound document targeting information may be compared to the output device or decomposition service by which the document is scheduled to be processed. Next, control continues to step S280, during which a decision may be made with respect to the compatibility of the targeting information of the compound document and the output target. If the target information of the compound document corresponds to the output target, then control continues to step S285. If the target information of the compound document does not correspond to the output target, then control continues to step S285, during which, for example, a warning message may be displayed to the user to inform the user that the targeting information of the compound document does not correspond to the output target. Next, control continues to step S290.

During step S290, when the targeting information of the compound document does not correspond to the output target, the compound document may be converted to be targeted to a different target device. In order to convert the compound document to a different target device, the compound document may be returned from a binary representation to a grayscale representation, then the compound document may be returned into a document targeted to the new target device. In the case of binary raster images, in order to convert the image to a different target device, the image may be returned from a binary representation to a grayscale representation. Then, the image may be returned into a binary image targeted to the new target device. In the case of contone raster images, in order to convert the image to a different target device, the image may be transformed by a CMYK to CMYK conversion. In the case of targeted PDL files, a conversion of a targeted PDL file to a different target device depends on the nature of the targeting, such as, for example, change of trapping parameters or use of a different available font. For example, in the case of a compound document that contains raster images, this analysis may be made part of already existing preflight software applications. Next, control continues to step S295, where the method ends.

It should be noted that these principles apply equally whether the targeting information is created such as, for example, at the time the document is generated at a scanner, by a print controller decomposition service or later via analysis of the document data itself, or whether such information is stored, for example, as tags internal to the document files, in the compound document itself or as metadata in a data repository.

Also, device-dependent targeting information may be passed to an output management system for use in job routing. Should job routing lead to document mistargeting, the principles discussed above would ensure the display of an appropriate warning message to a user.

An exemplary implementation of the above-discussed method on raster images is a makeready/prepress system in which, to the extent possible, the targeting of all raster images are determined, preserved and used. When brought into a system, whether from a scanner, a print controller decomposition service or a third party source, if the device-dependent raster image targeting is known, then the targeting will be saved. When the system processes and stores images, the targeting information of each image or of the entire compound document may also be saved. On export, targeting information may also be output. Finally, when printed, the targeting information may be incorporated into the print submission.

Figure 6:
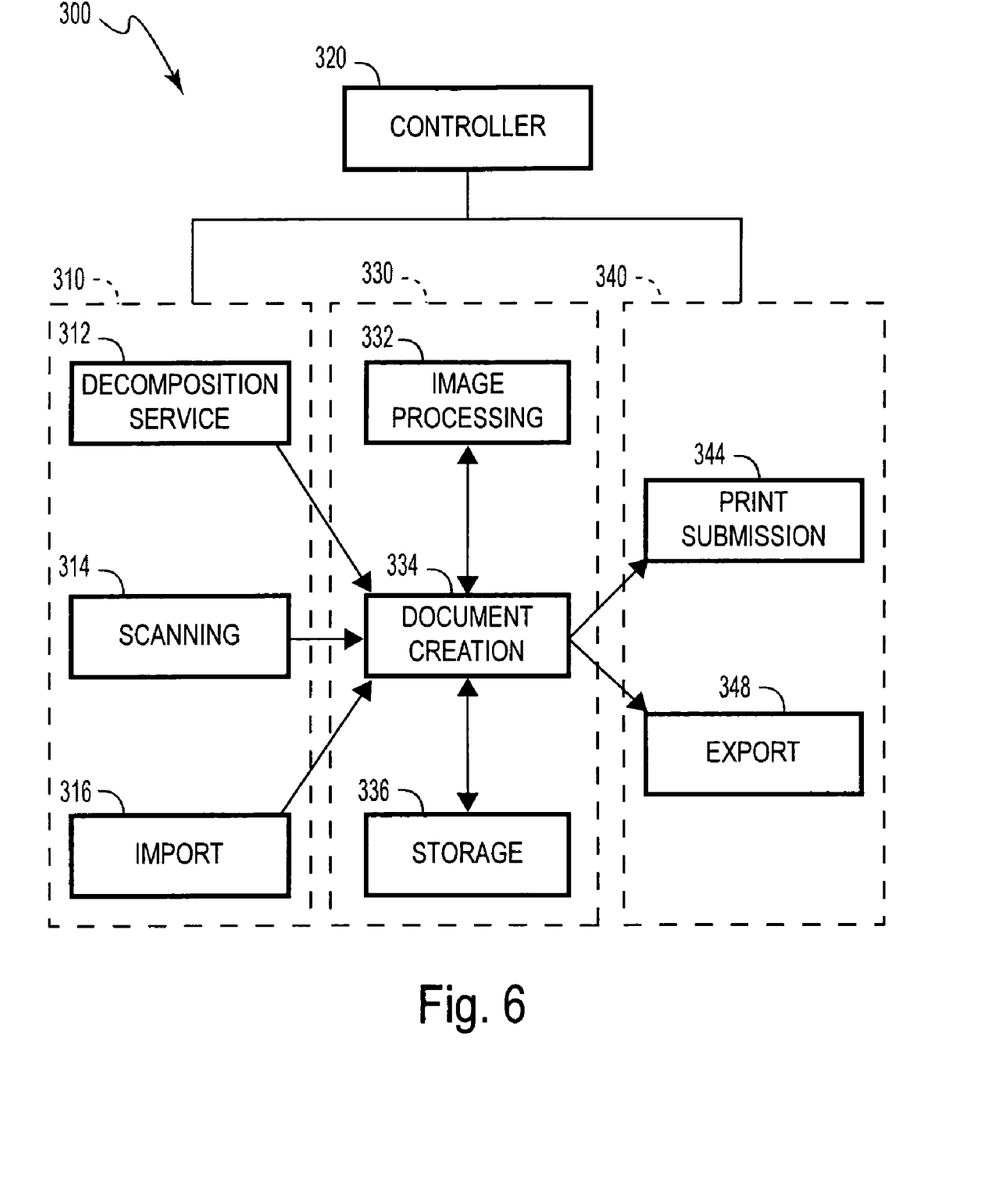
FIG. 6 is an exemplary illustration of a document tracking system, according to various exemplary implementations.

FIG. 6 illustrates an exemplary document tracking system 300. In FIG. 6, a controller 320 may be functionally coupled to, and may control an input module 310, a processing module 330, and an output module 340. According to various exemplary implementations, the input module 310 may include a decomposition service 312, a scanner 314 and/or an import section 316 that allow a document or an image to be input into the processing module 330. According to various exemplary implementations, the processing module 330 may include an image processing section 332, a document creation section 334 and a storage section 336. The document creation section 334 may, for example, allow the incorporation of one or more images into a compound document. The storage section 336 may, for example, allow the storage of target information. According to various exemplary implementations, the output module 340 may include a print submission module 344 and an export module 348 that allow the document, created and processed in the processing module 330, to be output to a target device. For example, when the input module 310 transmits an image to the processing module 330, the image processing section 332 may analyze the image and determine the targeting of the image and may compare the target information of the image to the output processing device that may be part of the output module 340. Also, the storage section 336 may store the targeting information of the image. Once the target information of the image and the output device in the output module 340 are compared, the image may then be transmitted to the output module 340 for processing.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A raster image target tracking method for a computer, the computer executing the steps of:
   determining target information stored within a first object and target information stored within a second object within a compound document, the first object and the second object each being at least one of a page description language file and a raster image, the first object being optimized for a first halftone screening parameter of a first target device and the second object being optimized for a second halftone screening parameter of a second target device, each target device being a specific marking device;
   saving the target information specific to halftone screening parameters of each object and the processing history of each object inside at least one of (1) a targeting information tag or label corresponding to the raster image, (2) the compound document or (3) a database, the target information being print processing information for print processing each object at a specific target device;
   comparing the target information from the first object with the target information from the second object to determine whether the first object is optimized for the second halftone screening parameter of the second target device; and
   providing a warning message to a user when the first object is not optimized for the second halftone screening parameter of the second target device, the warning message being provided before retargeting the first object to be optimized for the second halftone screening parameter of the second target device and before outputting the first object and the second object.

2. The method of claim 1, wherein the determining the target information from the first object and the second object comprises performing an analysis of the first object and the second object.

3. The method of claim 1, wherein the database is a document repository.

4. The method of claim 1, wherein the target information further comprises at least one of color space information, presence and type of error diffusion, halftone dot shape, number and frequency of dot cells, inherent tone reproduction curves, and marking technology.

5. The method of claim 1, further comprising retargeting the first object to be optimized for the second target device.

6. The method of claim 1, further comprising
   performing at least one preflight operation according to a preflighting tool or application on the first object or the second object,
   wherein the first object and the second object include at least one of a binary raster image and a targeted contone raster image.

7. A compound document analysis and target tracking method for a computer, the computer executing the steps of:
   providing a compound document that comprises a first object and a second object, the first object and the second objects being at least one of a page description language file and a raster image, the first object being optimized for a first halftone screening parameter of a first target device and the second object being optimized for a second halftone screening parameter of a second target device, each target device being a specific marking device;
   analyzing the first object and the second object to determine target information stored within the first object and target information stored within the second object;
   saving the target information specific to halftone screening parameters of each object and the processing history of each object inside at least one of (1) a targeting information tag or label corresponding to the raster image, (2) the compound document or (3) a database, the target information being print processing information for print processing each object at a specific target device;
   comparing the target information from the first object with the target information from the second object to determine whether the first object is optimized for the second halftone screening parameter of the second target device;
   providing a warning message to a user when the first object is not optimized for the second halftone screening parameter of the second target device;
   in response to input by the user in response to the warning message, performing at least one of:
      aborting the inclusion into the compound document of the first object or the second object,
      retargeting the first object to be optimized for the second halftone screening parameter of the second target device, and
      overriding the warning message and continuing with processing of the compound document.

8. The method of claim 7, wherein each object is at least one of a binary raster image, a targeted contone raster image, and a targeted page description language file.

9. The method of claim 7, further comprising
   comparing the target information from a new object added to the compound document to the target information from the first object and the target information from the second object at the time the new object is added to the compound document.

10. The method of claim 9, wherein the new object is at least one of a binary raster image, a targeted contone raster image, and a targeted page description language file.

11. The method of claim 7, further comprising
   setting a target device of the compound document as being the target device of the second object, the second object being the initial object added to the compound document.

12. The method of claim 7, wherein the saving the target information comprises saving the target information in at least one of a part of a format of the compound document and a document repository.

13. A document target tracking system, comprising:
   a controller;
   an input module controlled by the controller and that inputs a document comprising a first object being optimized for a first halftone screening parameter of a first target device and a second object being optimized for a second halftone screening parameter of a second target device, each target device being a specific marking device, the first object and the second objects being at least one of a page description language file and a raster image;
   a processing module controlled by the controller and that determines target information stored within the first object and target information stored within the second object;
   a memory that stores the target information specific to halftone screening parameters of each object and the processing history of each object inside at least one of (1) a targeting information tag or label corresponding to the raster image, (2) the compound document or (3) a database, the target information being print processing information for print processing the object at a specific target device; and an output module controlled by the controller and that outputs the document to a processing device, wherein the controller controls a comparison of the target information from the first object and the target information from the second object to determine whether the first object is optimized for the second target device, and the controller provides a warning message to a user when the first object is not optimized for the second halftone screening parameter of the second target device, the warning message being provided before retargeting the first object to be optimized for the second halftone screening parameter of the second target device and before outputting the document.

14. A marking device, comprising the document target tracking system of claim 13.

15. A page description language file target tracking method for a computer, the computer executing the steps of:

determining target information stored within a page description language file that comprises a raster image, the page description language file and the raster image being optimized for a halftone screening parameter of a target device;

saving the target information specific to the halftone screening parameter and the processing history of the page description language file inside at least one of (1) a targeting information tag or label corresponding to the raster image, (2) the page description language or (3) a database, the target information being print processing information for print processing the page description language file at a specific target device;

comparing the target information from the page description language file with a processing device by which the page description language file is to be processed to determine whether the page description language file is optimized for a halftone screening parameter of the processing device; and providing a warning message to a user when the page description language file is not optimized for the halftone screening parameter of the processing device, the warning message being provided before retargeting the page description language file to be optimized for the halftone screening parameter of the processing device and before outputting the page description language file.

16. The method of claim 15, wherein the determining the target information from the page description language file comprises performing an analysis of the page description language file.

17. The method of claim 15, wherein saving the target information comprises saving the target information in at least one of a part of a format of the page description language file and a page description language file repository.

18. The method of claim 15, wherein the target information of the page description language file further comprises at least one of rasterization parameters, color spaces, trapping, Open Prepress Interface parameters, fonts, Document Structuring Convention comments and device specific page description language instructions.

19. The method of claim 15, further comprising retargeting the page description language file to be optimized for the processing device.

20. The marking device of claim 14, wherein the marking device is a xerographic device.

* * * * *